Patented Dec. 22, 1953

2,663,616

UNITED STATES PATENT OFFICE 2,663,616

METHOD FOR TREATING WOOL

Georg Sulzer, Basel, Switzerland, assignor to Ciba Limited, Basel, Switzerland, a Swiss firm No Drawing. Application July 9, 1951, Serial No. 235,907

Claims priority, application Switzerland April 27, 1949

10 Claims. (Cl. 8—127.6)

This application is a continuation-in-part of my application Ser. No. 156,489, filed April 17, 1950, and now abandoned.

This invention relates to a method of treating wool with an aqueous solution containing active chlorine as well as to wool treated by this method.

The chlorination of wool, that is to say the treatment of wool with chlorine or with aqueous solutions containing active chlorine, such as aqueous solutions of chlorine or of hypochlorous acid or salts thereof, has been recommended for rendering it resistant to shrinkage and felting. The rapid reactivity of chlorine towards wool is harmful in that it easily leads to local irregularities in the chlorinating action.

Proposals for overcoming this disadvantage have already been made. In the U. S. Patent No. 2,144,824 it has been proposed to retard the action of chlorine or hypochlorites on wool by the addition of ammonia or compounds containing amino or imino groups, more especially the degradation products of proteins. Furthermore, U. S. Patent No. 2,395,724 suggests the application to the wool, before the chlorination treatment, of a melamine-formaldehyde condensation product in order to protect the wool from injury.

The present invention is based on the observation that the foregoing disadvantage can be remedied more effectively and simply by conducting the chlorination in the presence of a water-soluble methylol compound of melamine, or in the presence of water-soluble alkylated, particularly methylated methylol compound of melamine.

By water-soluble methylol compounds of melamine, which may be used for the present invention there are understood melamine-formaldehyde condensation products soluble in water at least with addition of some hydrochloric acid and obtainable by reacting melamine with formaldehyde in an alkaline medium as well as alkylated methylol compounds of melamine which are soluble in water at least with addition of some hydrochloric acid and which may be obtained in known manner by condensing melamine, formaldehyde and the alcohol, particularly methanol, or by etherifying a methylol compound of melamine, both reactions being conducted in the presence of an acid.

The present invention is also based on the observation that the aforesaid derivatives of melamine (2.4.6-triamino-1.3.5-triazine) may be replaced, with similar result, by methylol compounds or alkylated, particularly methylated, methylol compounds of other aminotriazines containing at least two amino groups and being free from other reactive substituents, such as formoguanamine (4.6 - diamino-1.3.5-triazine), acetoguanamine (4.6 - diamino-2-methyl-1.3.5-triazine), benzoguanamine (4.6-diamino-2-phenyl-1.3.5-triazine) or the like, or by alkyl ethers, particularly the dimethyl ether, of dimethylol urea. All these compounds must be soluble in water at least with addition of some hydrochloric acid, and they may be obtained in an analogous manner as the melamine derivatives described hereinbefore.

According to this invention, therefore, in a process for the treatment of wool with an aqueous solution containing active chlorine, the treatment is conducted in the presence of a water-soluble methylol compound selected from the groups consisting of methylol compounds of an aminotriazine containing at least two amino groups and being free from other reactive substituents, alkyl ethers of such methylol compounds and alkyl ethers of dimethylol urea.

By this process the reaction of the chlorine with the wool is retarded in such a way that local under- or over-chlorination is prevented to a very considerable extent. Wool treated by the process of this invention exhibits, when washed, the desired resistance to shrinkage and felting, and also a considerably better resistance to changes in shape than wool which has been treated, for example, with Javelle water alone.

These condensation products may be added to the treatment bath directly or in the form of aqueous solutions. In a few cases it has been found of advantage to immerse the wool first in an aqueous solution of the condensation product and then to add active chlorine to the bath.

According to the present invention, the treatment of the wool is preferably carried out at low temperatures, i. e. without that the treatment bath is heated at any stage of the process. It has proved to be appropriate to keep the temperature of the bath at about 16° C. during the whole treatment. According to the quantity and the kind of methylol compound used in the bath and according to the quantity of active chlorine present in the bath, the chlorination can also be carried out at a higher temperature at least towards the end of the treatment, for instance at about 60° C. Such a method of working has proved to be successful by using a methylated condensation product from melamine and formaldehyde. The chlorination at raised temperature allows a good regulation of the chlorinating reaction and an economic utilization of the active chlorine which is present in the bath. The process is preferably so conducted that the wool is first brought into an aqueous solution of the methylol compound in the cold, i. e. below or at about room temperature, whereupon the chlorinating agent for instance in the form of an aqueous sodium hypochlorite solution is added to the solution, if necessary in several portions, and that after addition of the last portion of the chlorinating agent the temperature of the bath is raised to above room temperature, preferably to about 60° C., thus terminating the chlorination of the wool. The process may also be performed in such a way that the wool is brought into a liquor containing the whole quantity of the chlorinating agent and the methylol compound and heating the liquor towards the end of the treatment.

The following examples illustrate the invention, the parts and percentages being by weight:

Example 1

33 parts of wool yarn, after being wetted are treated for about 30 minutes at about 16° C. while being gently worked, in a bath which contains in 1000 parts of water 2 parts of a methylated methylol compound of melamine, 0.8 part of aqueous hydrochloric acid of 30 per cent. strength, 0.6 part of sulphuric acid of 99 per cent. strength and 0.8 part of active chlorine in the form of Javelle water. The yarn is then rinsed, dechlorinated in the usual manner with sodium bisulphite, rinsed again, centrifuged and dried at about 70° C.

The wool so treated, as compared with wool which has been treated with Javelle water alone, exhibits the same resistance to felting but has a fuller feel and a much improved resistance to change of shape when washed.

The methylated methylol compound of melamine used in this example may be prepared as follows: 40.3 parts of melamine are condensed in known manner under alkaline conditions at a raised temperature with 192 parts of aqueous formaldehyde solution of 37 per cent. strength, and the resulting condensation product is etherified after the addition of 157 parts of methanol and concentrated hydrochloric acid. After neutralization with caustic soda solution volatile constituents are distilled off until the mixture has a content of dry substance of 72–75 per cent.

Example 2

Wool yarn is treated in the manner described in Example 1, except that the bath contains in 1000 parts of water 8 parts of the same methylated methylol compound of melamine as is used in Example 1, 3.2 parts of aqueous hydrochloric acid of 30 per cent. strength, 1.2 parts of sulphuric acid of 99 per cent. strength and 1.6 parts of active chlorine in the form of Javelle water. The yarn has properties similar to those of the goods treated as described in Example 1.

A similar procedure is followed when non-etherified methylol compounds of melamine are used, for example, a condensation product from 1 mol of melamine and about 3 mols of formaldehyde which has only limited solubility in water but unlimited solubility in water in the presence of an acid.

Example 3

33 parts of wool yarn are treated for about 10 minutes at about 16° C. in a dyeing apparatus with a circulating bath which contains in 1000 parts of water 0.27 part of the same methylated methylol compound of melamine as used in Example 1, 2 parts of aqueous hydrochloric acid of 30 per cent. strength and 0.17 part of the sodium salt of dibutyl naphthalene sulfonic acid as wetting agent. 0.33 part of active chlorine in the form of diluted Javelle water is then added to the circulating bath in five equal portions in intervals of about 10 minutes. After addition of the last portion the treatment of the wool yarn in the circulating bath is continued for about a further hour, whereupon the wool yarn is after-treated as described in Example 1.

Example 4

67 parts of wool yarn are treated for about 10 minutes at about 16° C. in a dyeing apparatus with a circulating bath which contains 1000 parts of water, 2.67 parts of a methylated melamine-formaldehyde condensation product and 4 parts of aqueous hydrochloric acid of 30 per cent. strength. 0.67 part of active chlorine in the form of an aqueous sodium hypochlorite solution are then added to the circulating bath in five equal portions within about 40 minutes, the bath showing a temperature of 16°–18° C. About 5 minutes after the addition of the last portion of the active chlorine, the temperature of the bath is raised to about 60° C. within about ½ hour and the treatment of the wool continued until the chlorine is practically entirely consumed. The wool is dechlorinated in the usual manner by adding to the bath 4 parts of a commercial aqueous sodium bisulfite solution of about 40 per cent. strength. After rinsing and drying, the yarn shows a good resistance to felting and shrinkage when washed.

Example 5

25 parts of a knitted woollen fabric are prewetted in an aqueous solution containing in 1000 parts 2 parts of an ion-free wetting agent, such as for instance of a water-soluble condensation product from an organic hydroxyl compound and ethylene oxide, whereupon the goods is treated in a reel vat for about 10 minutes at about 16° C. with a bath which contains 1000 parts of water, 0.5 part of the above-mentioned wetting agent, 0.5 part of the methylated melamine-formaldehyde condensation product used in Example 1 and 1.75 parts of aqueous hydrochloric acid of 30 per cent. strength. 0.25 part of active chlorine in the form of an aqueous sodium hypochlorite solution is then added to the bath within about 40 minutes in five equal portions. Thereupon, the temperature of the bath in presence of the knitted woollen fabric is raised to about 60° C. within about 30 minutes. At this temperature, the treatment of the wool is terminated within about a further 15 minutes and the knitted woollen fabric dechlorinated as indicated in Example 1, rinsed and dried.

In case the wool should still be dyed, it is appropriate to treat it, before dyeing or drying, respectively, with aqueous ammonia for the purpose of neutralization.

The knitted wool fabric so treated exhibits a good resistance to felting and shrinkage when washed.

Example 6

33 parts of well wetted wool yarn are treated with frequent movement at 16° C. in a bath which contains in 1000 parts of water 0.67 part of the methylol-benzoguanamine obtained by the condensation of 1 mol of benzoguanamine with about 4 mols of formaldehyde, 0.8 part of active chlorine in the form of Javelle liquor and 1.35 parts of hydrochloric acid of 30 per cent. strength. After 10 minutes a further 0.65 part of hydrochloric acid of 30 per cent. strength is added, whereupon the yarn is further treated for 50 minutes at 16° C. In order to remove the chlorine the yarn is then treated for 10 minutes at 16° C. in a bath containing, per litre, 5 cc. of a sodium bisulphite solution of 40 per cent. strength. The yarn is then rinsed and dried at about 50–70° C.

Instead of the methylol-benzoguanamine there may be used with equal success, for example, the methyl ether thereof, or a condensation product of 1 mol of acetoguanamine or 1 mol of formoguanamine with about 2–4 mols of formaldehyde or the methyl ether of such a condensation product.

Similar results are obtained by using instead of 0.67 part, only about 0.167 part of the condensation products mentioned above.

*Example 7*

33 parts of wool yarn are treated for about 10 minutes at about 16° C. in a dyeing apparatus having a circulating bath which contains 1000 parts of water, 0.26 part of the product of the etherification with methyl alcohol of a condensation product of 1 mol of formoguanamine with 3.5 to 4 mols of formaldehyde, and 2 parts of an aqueous solution of hydrochloric acid of 30 per cent. strength. To the circulating bath there are then added in all 0.33 part of active chlorine in the form of a dilute solution of sodium hypochlorite in 5 approximately equal portions at intervals of about 10 minutes. After the addition of the last portion the treatment of the wool yarn in the circulating bath is continued for about 30 minutes longer at about 16° C., and then 2 parts of an aqueous solution of sodium bisulphite of about 40 per cent. strength are added to the chlorination bath in order to eliminate the chlorine, and then wool is after-treated in the resulting solution for about 15 minutes.

*Example 8*

33 parts of wool yarn, after being previously wetted, are treated for about 1 hour at about 16°. C. in a bath containing 1000 parts of water, 2.67 parts of the dimethyl ether of dimethylol-urea, 0.8 part of active chlorine in the form of Javelle liquor and 2.0 parts of aqueous hydrochloric acid of 30 per cent. strength, the goods being occasionally gently worked in the bath. The hydrochloric acid is added to the bath in two portions, the first portion being added when making up the bath and amounting to 1.3 parts of aqueous hydrochloric acid of 30 per cent. strength and the second portion being added 10 minutes after the commencement of the treatment of the wool and amounting to 0.7 part of aqueous hydrochloric acid of 30 per cent strength. After the treatment the yarn is rinsed, dechlorinated in the usual manner with sodium bisulphite, centrifuged and dried at about 50–70° C.

The dimethyl ether of dimethylol-urea used above may, for example, be prepared as follows:

150 parts of dimethylol-urea are introduced in portions in the course of 3 minutes into 1000 parts of methyl alcohol at about 50° C., while stirring, and then 0.6 part of aqueous hydrochloric acid of 36 per cent. strength is added, whereupon after a further 4 minutes the dimethylol-urea dissolves leaving only a small amount of insoluble material. By the addition of 0.38 part of an aqueous solution of sodium carbonate the hydrochloric acid is neutralised, the solution is then filtered while still warm, and the filtrate is concentrated by distilling off about 750 parts of methyl alcohol. By cooling the concentrate to about −8° C. and allowing it to stand the colourless dimethyl ether of dimethylol-urea crystallises out, and is separated from the mother liquor by filtration. Instead of the dimethyl ether of dimethylol-urea used in the above example, there may be used with equal success the diethyl ether of dimethylol-urea.

What I claim is:

1. A method of treating wool with an acidic aqueous solution containing active chlorine which process comprises conducting the treatment in the presence of a water-soluble methylol compound selected from the group consisting of methylol compounds of an aminotriazine containing at least two amino groups and being free from other reactive substituents, alkyl ethers of such methylol compounds and alkyl ethers of dimethylol urea, and thereafter removing the said methylol compound by rinsing, and dechlorinating the wool.

2. A method of treating wool with an acidic aqueous solution containing active chlorine which process comprises conducting the treatment in the presence of a water-soluble methylol compound of melamine, and thereafter removing the said methylol compound by rinsing, and dechlorinating the wool.

3. A method of treating wool with an acidic aqueous solution containing active chlorine which process comprises conducting the treatment in the presence of a water-soluble alkylated methylol compound of melamine, and thereafter removing the said methylol compound by rinsing, and dechlorinating the wool.

4. A method of treating wool with an acidic aqueous solution containing active chlorine which process comprises conducting the treatment in the presence of a water-soluble methylated methylol compound of melamine, and thereafter removing the said methylol compound by rinsing, and dechlorinating the wool.

5. A method of treating wool with an acidic aqueous solution containing active chlorine which process comprises conducting the treatment in the presence of a water-soluble methylol compound of an aminotriazine containing two $NH_2$-groups and being free from other reactive substituents, and thereafter removing the said methylol compound by rinsing, and dechlorinating the wool.

6. A method of treating wool with an acidic aqueous solution containing active chlorine which process comprises conducting the treatment in the presence of a water-soluble alkylated methylol compound of an aminotriazine containing two $NH_2$-groups and being free from other reactive substituents, and thereafter removing the said methylol compound by rinsing, and dechlorinating the wool.

7. A method of treating wool with an acidic aqueous solution containing active chlorine which process comprises conducting the treatment in the presence of a water-soluble methylated methylol compound of an aminotriazine containing two $NH_2$-groups and being free from other reactive substituents, and thereafter removing the said methylol compound by rinsing, and dechlorinating the wool.

8. A method of treating wool with an acidic aqueous solution containing active chlorine which process comprises conducting the treatment in the presence of a water-soluble alkyl ether of dimethylol urea, and thereafter removing the said methylol compound by rinsing, and dechlorinating the wool.

9. A method of treating wool with an acidic aqueous solution containing active chlorine which process comprises conducting the treatment in the presence of a water-soluble dimethyl ether of dimethylol urea, and thereafter removing the said methylol compound by rinsing, and dechlorinating the wool.

10. A method of treating wool with an acidic aqueous solution containing active chlorine which process comprises conducting the treatment in the presence of a water-soluble diethyl ether of dimethylol urea, and thereafter removing the said methylol compound by rinsing, and dechlorinating the wool.

GEORG SULZER.

References Cited in the file of this patent

UNITED STATES PATENTS

| Number | Name | Date |
|---|---|---|
| 787,923 | Kann | Apr. 25, 1905 |
| 1,693,926 | Horsfall | Dec. 4, 1928 |
| 2,144,824 | Wiegand | Jan. 24, 1939 |
| 2,299,200 | Adams | Oct. 20, 1942 |
| 2,329,622 | Johnstone | Sept. 14, 1943 |
| 2,383,963 | Gottfried | Sept. 4, 1945 |
| 2,395,724 | Cowley | Feb. 26, 1946 |
| 2,422,586 | Royer | June 17, 1947 |
| 2,427,097 | Kamlet | Sept. 9, 1947 |
| 2,456,568 | Scott | Dec. 14, 1948 |

FOREIGN PATENTS

| Number | Country | Date |
|---|---|---|
| 117,933 | Australia | Dec. 17, 1943 |
| 13,088 | Great Britain | 1911 |